United States Patent Office 3,243,358
Patented Mar. 29, 1966

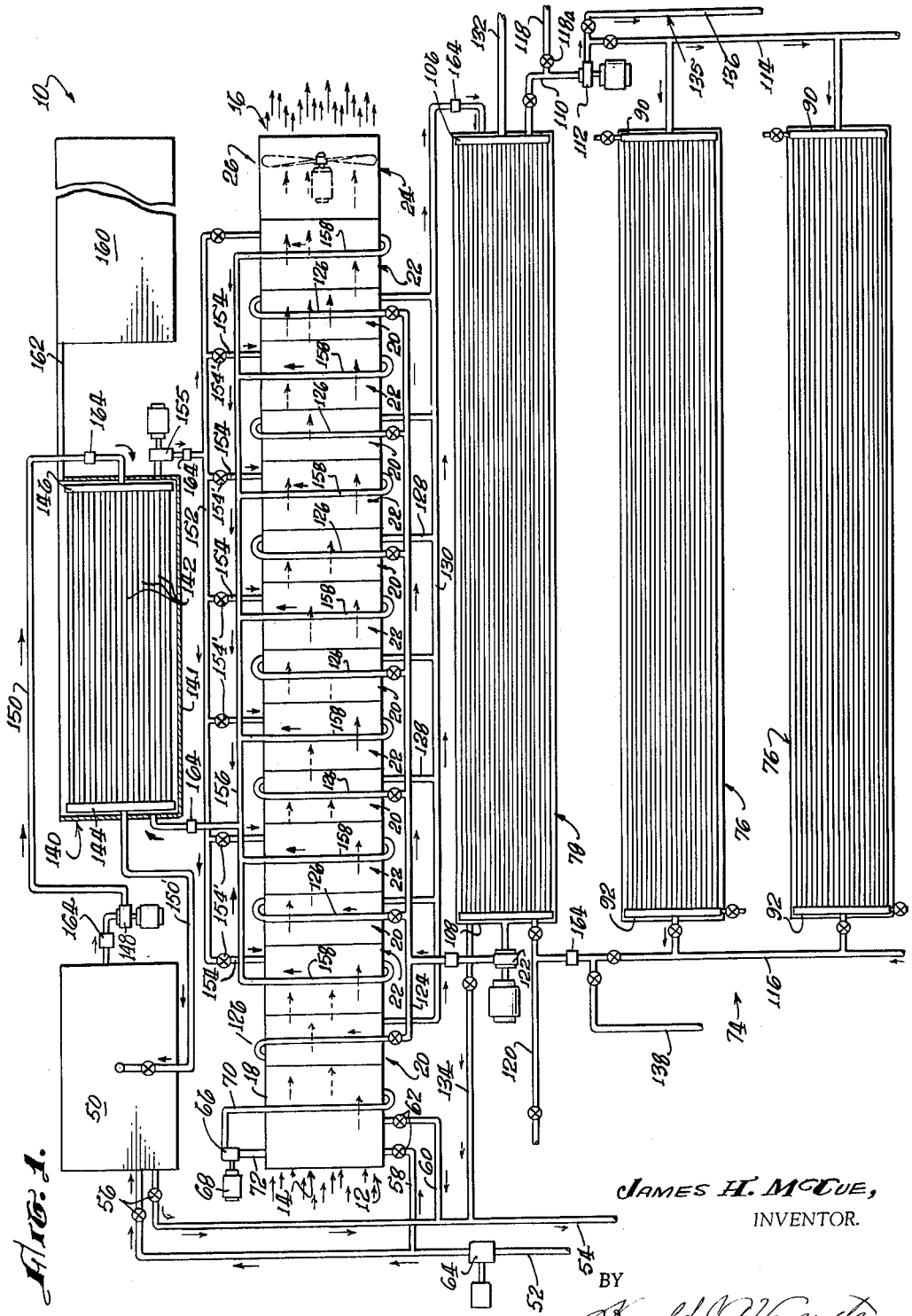

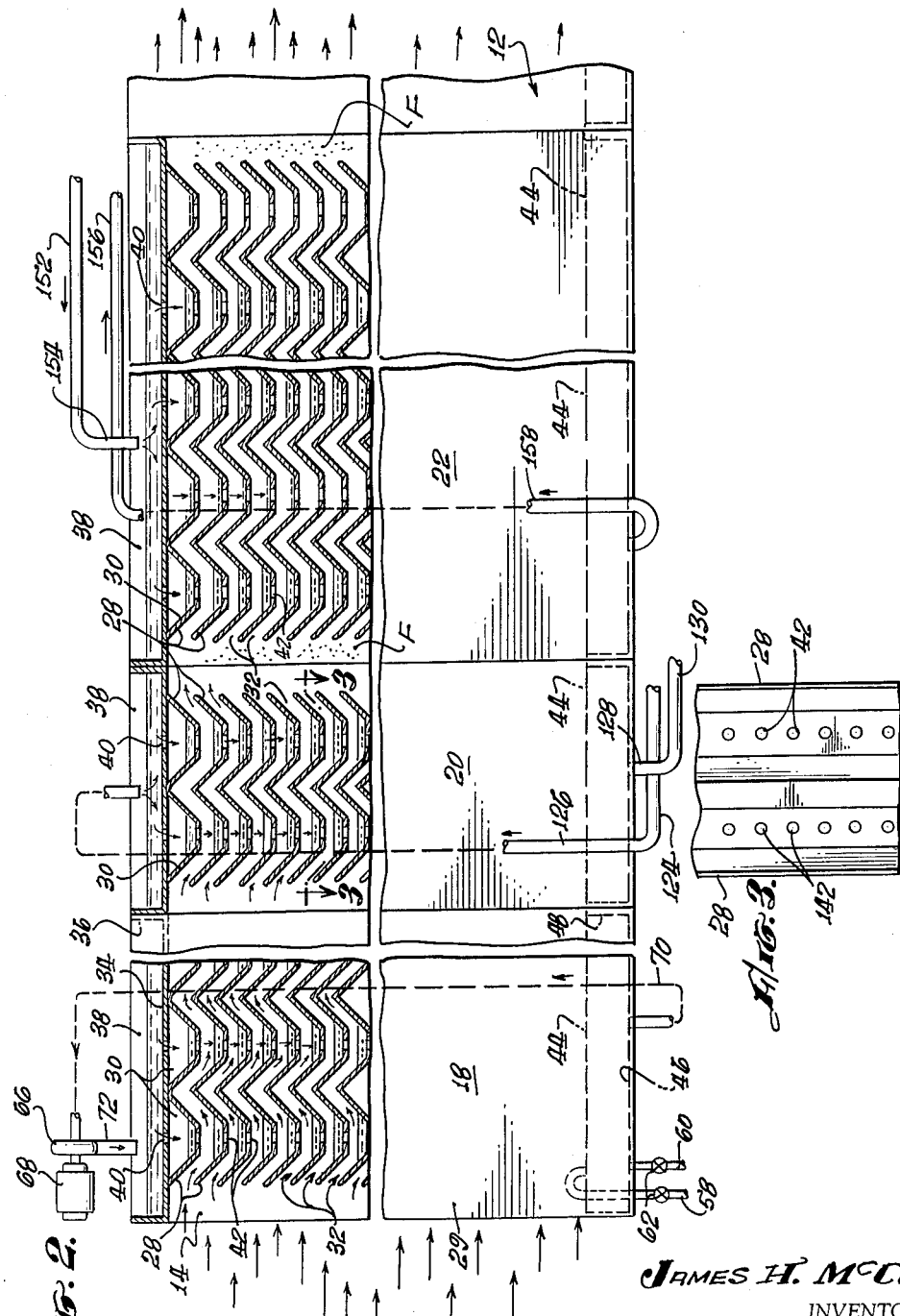

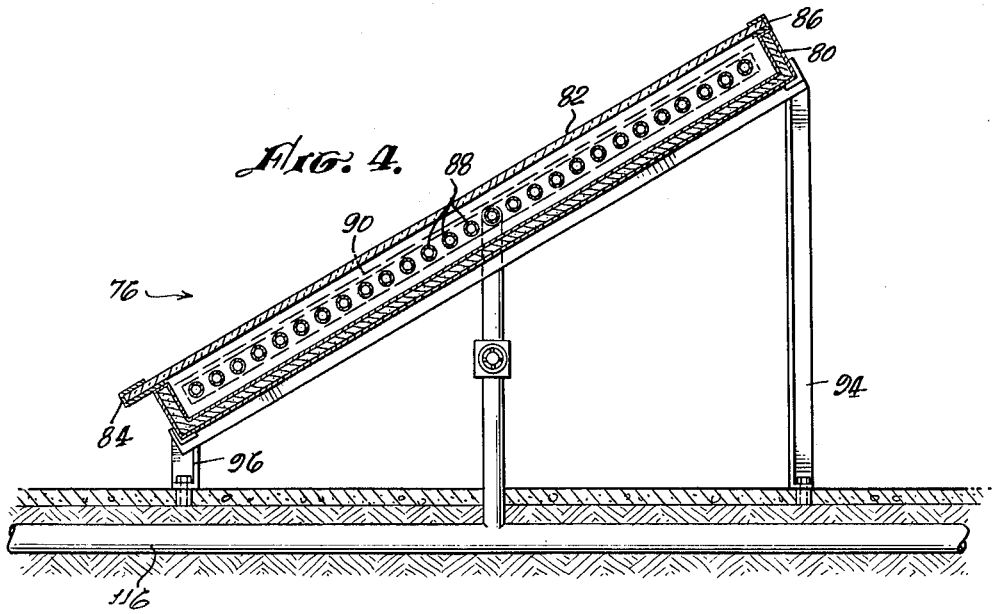
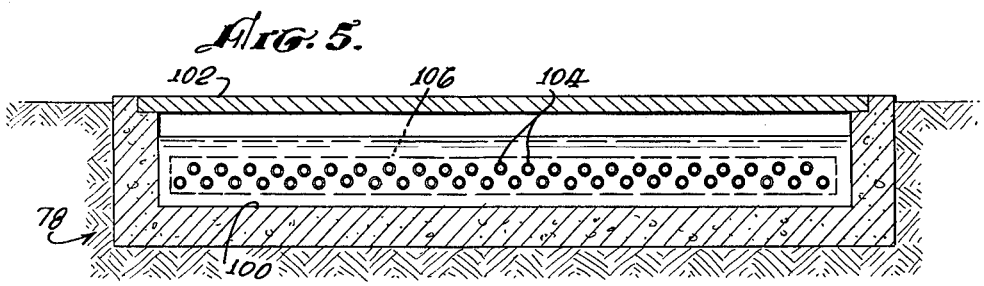

3,243,358
WATER PURIFYING MEANS
James H. McCue, 2200 N. Arroyo Blvd., Altadena, Calif.
Filed Feb. 24, 1964, Ser. No. 346,930
8 Claims. (Cl. 202—173)

This invention relates generally to the art of purifying water and more particularly to improved desalinization apparatus for converting sea water or similarly brackish water to fresh water.

Fresh water is a commodity which is in ever increasing demand for household consumption, industrial use, and irrigation. This is particularly so in many arid parts of the world where desert land must be irrigated to grow the crops necessary to sustain an ever increasing population. Many and varied systems have been proposed for increasing the available supply of fresh water in areas where there is a shortage of such water. Among the more exotic of these systems are the sea water conversion or desalinization systems.

Desalinization of sea water, that is removal of dissolved salts, minerals, and other impurities from sea water to make the latter potable, is an age old dream of mankind which has long resisted practical fulfillment, at least on a large enough scale to supply the fresh water needs of even a small locality. Many different types of sea water desalinization systems have been devised, of course. Among the most practical of these systems, from the standpoint of large scale fresh water production, are those wherein the sea water is evaporated and the resulting fresh water vapors are subsequently condensed.

Large scale production of fresh water from sea water is impractical or impossible with existing sea water conversion systems for two reasons. First, in the existing systems, the thermal energy required for evaporation of the sea water must be generated in some way. Up until the recent practical utilization of nuclear energy, it was impractical or impossible to generate sufficient thermal energy to sustain a large scale sea water evaporation process. Even the existing nuclear powered sea water conversion systems, while they have a fresh water output that far exceeds any other type of sea water conversion system, can meet the fresh water needs of only a relatively small locality. Secondly, the existing sea water conversion systems, including nuclear powered systems, are complex in construction and costly to manufacture. In addition, the cost of operating these systems is very high, particularly since they require an external source of energy, either electrical, chemical, or nuclear.

As a result, the unit cost of the fresh water produced in existing conversion systems is relatively high. For example, the minimum cost of the fresh water produced by these systems is on the order of $1.00 to $1.25 per thousand gallons. This is roughly twice the cost of delivered domestic water in Southern California. It is apparent, therefore, there is a definite need for practical sea water desalinization apparatus.

A general object of the present invention is to provide improved sea water desalinization apparatus for producing fresh water from sea water.

Another object of the invention is to provide improved sea water desalinization apparatus which is relatively inexpensive to construct, operate, and maintain, and utilizes only solar energy, whereby fresh water is produced at minimum cost, far less than that required to produce fresh water with the existing sea water conversion equipment.

A further object of the invention is to provide improved sea water desalinization apparatus which utilizes a continuous sea water conversion process, whereby the apparatus is capable of large scale fresh water production.

A still further object of the invention is to provide sea water desalinization apparatus which is designed for use in relatively dry, arid localities.

With the foregoing objects in view, together with such additional objects and advantages as may subsequently appear, the invention resides in the provision of a desalinization means and method described, by way of example, in the following specification of a presently preferred embodiment of the invention, reference being had to the accompanying drawings which form a part of said specification, and in which drawings:

FIG. 1 diagrammatically illustrates sea water desalinization apparatus according to the invention;

FIG. 2 is an enlarged vertical section through a portion of the apparatus in FIG. 1;

FIG. 3 is a section taken along line 3—3 in FIG. 2;

FIG. 4 is an enlarged vertical section through a solar heater embodied in the apparatus of FIG. 1; and FIG. 5 is an enlarged vertical section through a heat exchanger embodied in the apparatus of FIG. 1.

The sea water conversion apparatus 10 illustrated in FIG. 1 of these drawings comprises a long conduit 12 in which the present continuous sea water conversion process is carried out. Conduit 12 is open at its ends. The open, left hand end of the conduit, as the latter viewed in FIG. 1, forms an air inlet 14. The open, right hand end of the conduit forms an air outlet 16. Conduit 12 is composed of a series of separate chambers 18, 20, 22 and 24 which are bolted, or otherwise rigidly secured together. As will be seen later, chamber 18 forms an air conditioning chamber, each chamber 20 forms a sea water vaporizing chamber, each chamber 22 forms a fresh water condensing chamber, and chamber 24 forms a blower chamber. For this reason, the chambers will be hereinafter referred to as conditioning, vaporizing, condensing and blower chambers, respectively. The confronting sides of the chambers are open, whereby air may enter the conduit 12 through its inlet 14, flow lengthwise through the conduit, and exhaust to atmosphere through its outlet 16. Within the chamber 24 is a fan or blower 26 for inducing air flow through the conduit.

Conditioning chamber 18, vaporizing chambers 20, and condensing chambers 22, are substantially identical. Within each of these chambers are a series of generally horizontal trays 28 which are arranged one over the other, in a manner shown in FIG. 2. Each tray is rigidly attached at its ends to the side walls 29 of the respective chamber. The several trays in each chamber are shaped to form in each tray a plurality of upwardly opening troughs 30. These troughs extend crosswise of the conduit 12 and thus transverse to the direction of air flow through the conduit. The trays are vertically spaced to define therebetween tortuous air passages 32.

The top wall 34 of each chamber 18, 20 and 22 is bounded by upstanding walls 36 to define a well 38 at the upper end of each chamber. Extending through the top wall 34 of each chamber, in line with the troughs 30 of the underlying trays 28, are rows of weep holes 40. The trays have additional weep holes 42 opening through the bottoms of their troughs 30. In the lower end of each chamber 18, 20 and 22 is a well 44. This well is defined by the bottom wall 46 and side walls 29 of the respective chamber and by upstanding cross walls 48 extending between the side walls.

Numeral 50 in FIG. 1 designates a conventional sea water cooling tower. Connected to the water inlet of this tower is a sea water supply line 52. Connected to the water outlet of the tower is a sea water return line 54. Sea water lines 52 and 54 are equipped with valves 56 for regulating the flow of sea water to and from the tower 50. Extending from the sea water supply line 52 to the well 44 in the lower end of the air conditioning chamber 18 is a branch supply line 58. Extending from the bottom of the well to the sea water return line 54 is a branch return line 60. These branch lines are equipped with valves 62 for regulating flow of sea water to and from the latter well 44. In operation, sea water supply line 52 is connected to a source of sea water, such as the ocean. The line is equipped with a pump 64 for pumping sea water to the cooling tower 50 and to the well 44 in the bottom of the air conditioning tank 18. In some cases, the sea water return line 54 may discharge back to the ocean or to some other suitable drainage facility. In other cases, the return line may discharge to a brine pond to permit recovery of minerals and salts from the sea water.

It is apparent at this point, therefore, that the pump 64 is effective to deliver sea water to the cooling tower 50 and to the well 44 in the lower end of the air conditioning tank 18. As will be explained later, the cooling tower is used to cool fresh water which is employed as a condensing medium in the continuous sea water conversion process carried out in the apparatus. The sea water delivered to the well 44 in the conditioning chamber 18 is constantly recirculated through the chamber. To this end, there is mounted on the upper end of the chamber a pump 66 driven by a motor 68. The intake of the pump communicates with the bottom of the well 44 in chamber 18 through a line 70. The discharge of the pump communicates to the upper well 38 of chamber 18 through a line 72. Assuming that the sea water valves 62 for chamber 18 are set to maintain its lower well 44 full of sea water, operation of the pump 66 is effective to pump water from the lower well 44 to the upper well 38 of chamber 18. The sea water drains from this well, through the weep holes 40, into the trough 30 of the uppermost tray 28 within the conditioning chamber. The sea water then drips downwardly from tray to tray, through the weep holes 42 in the trays, finally returning to the lower well 44 in the conditioning chamber from whence it is returned to the upper well 38 to repeat the process. The weep holes 42 in the trays are proportioned so that under normal operating conditions, the trough 30 in the trays are maintained partly filled with sea water, as indicated in FIG. 2.

Vaporizing chambers 20 are supplied with hot sea water from a solar heater 74. This solar heater is composed of one or more solar energy absorbers 76 and a heat exchanger 78. FIG. 4 is a section through one of the energy absorbers 76. This absorber comprises a chamber 80 whose walls preferably consist of a thermal insulating material of some type. The normally upper side of chamber 80 is open. Extending across this open side of the chamber is a cover 82 of a material, such as glass, which is transparent to the thermal energy radiations from the sun. Cover 82 is retained in opsition in any convenient way, such as providing the chamber 80 with brackets 84 and 86 to slidably receive the edges of the cover. Extending through the chamber 80 are multiplicity of water lines 88. These water lines are connected at one end to an inlet header 90 and at the other end to an outlet header 92.

According to the preferred practice of the invention, the solar energy absorbers 76 are stationarily mounted in a position to receive maximum thermal radiation from the sun. This may be accomplished by positioning each absorber so that it faces south and is disposed at an angle of approximately 30° below the horizontal. The energy absorber shown in FIG. 4 is supported directly on the ground by legs 94 and 96. These legs are of different lengths, as shown, so as to position the energy absorber at the 30° angle just mentioned.

As shown best in FIG. 5, the heat exchanger 78 of the solar heater 74 comprises a chamber 100, which may be embedded in the ground, as shown. The wall of this chamber preferably resists heat loss from the interior of the container to the surrounding soil. To this end, the walls of the chamber may be made relatively thick and/or of a thermal insulating material. The upper side of chamber 100 is open and disposed substantially flush with the surface of the ground. Extending across the open side of the chamber is a cover 102 composed of material, such as glass, which is transparent to the thermal radiations from the sun. The edges of this cover seat in recesses in the side walls of chamber 100. Extending lengthwise through the chamber 100 are multiplicity of water pipes 104 which are preferably arranged in the staggered pattern illustrated. Water pipes 104 are connected at one end to an inlet headed 106 and at their other ends to an outlet header 108.

Connected to the inlet header 106 of the heat exchanger 78 is a water line 110 which connects to the intake of a pump 112. Connected to the outlet of this pump is a water line 114. The inlet headers 90 of the solar energy absorber 76 are connected to line 114. The outlet headers 92 of the energy absorbers are connected to a water line 116. Water line 116 connects to the inlet header 108 of heat exchanger 78. Connected to line 110 leading to the pump 112 is a water line 118 adapted for connection to a supply of fresh water. In practice, the solar radiator flow system including the solar energy absorbers 76, the pipes 104 of the heat exchanger 78, and the various interconnecting water lines are filled with fresh water. During operation of the pump 112, this fresh water is constantly recirculated from the solar energy absorbers 76, through the pipes 104 of the heat exchanger 78, and back to the solar energy absorbers. Leading from fresh water line 116 is a drainage line 120 through which fresh water may be bled from the system, when desired. Valves are placed at the positions illustrated for regulating water flow through the fresh water system.

Chamber 100 of heat exchanger 78 is connected, at one end, to the intake of a pump 122. The discharge of this pump connects to a header line 124. Extending from the header line 124 to each vaporizing chamber 20 is a branch line 126. Branch lines 126 open to the upper wells 38 in the vaporizing chambers 20, respectively, as may be best observed in FIG. 2. The lower wells 44 in the vaporizing chambers 20 are connected, through branch lines 128, to a common return line 130. This return line connects to the other line of the heat exchanger chamber 100. Chamber 100 is adapted to be filled with sea water through a sea water supply line 132. Leading from the chamber 100 is a sea water drainage line 134 which connects to the sea water return line 54.

In operation of the illustrated desalinization apparatus, the fresh water system of the solar heater 74, including the solar energy absorbers 76, water pipes 104 of the heat exchanger 78, and the interconnecting water lines therebetween are initially filled with fresh water through fresh water supply line 118. Fresh water supply valve 118a then closed, whereby the fresh water system of the solar heater becomes a closed system. Pump 112 recirculates the fresh water through this closed system, so that the water flows from the solar energy absorber 76, through the pipes 104 of the heat exchanger 78, and back through the pipes 88 of the solar energy absorbers. The sea water pump 122 of the solar heater pumps sea water from the chamber 100 of the heat exchanger 98, to the upper wells 38 of the vaporizing chambers 20. The water drips from these chambers to the uppermost underlying tray 28, through the weep holes 40 in the bottoms of the wells, and then drips downwardly, from tray to tray, through the weep holes 42 in the trays. The sea water eventually returns to the lower wells 44 in the vaporizing chambers, from whence it is recirculated back through the heat exchanger 78 to the upper wells of the vaporizing chambers by the sea water pump 122.

The fresh water within the closed fresh water circuit of the solar heater 74 is heated by solar radiation as it flows through the solar energy absorber 76. During subsequent flow of the fresh water through the heat exchanger 78, it transfers its heat to the sea water within the exchanger. The sea water within the exchanger, therefore, is heated, both by heat transfer from the fresh water and by direct solar radiation entering the exchanger through its transparent cover 102.

As will be seen shortly, the present desalinization apparatus is designed for operation in desert and other hot dry areas where the temperature of the sea water emerging from the heat exchanger 78 may be on the order of 100° or more. Even in these areas, however, it may be necessary, from time to time, to heat the sea water by other than solar energy. To this end, there is associated with the solar heater 74, an external heating circuit 135' including water lines 136 and 138 which connect to the fresh water lines 114 and 116, respectively, of the closed fresh water circuit of the solar heater. This external heating circuit includes an oil heater, or other type of water heater (not shown). Valves are placed in the solar and external heating circuits, as shown, for regulating fresh and sea water flow through the heaters. It is apparent, therefore, that the solar heater 74 may be assisted by the external heater, when necessary, by diverting a portion of the fresh water flow in the solar heater through the external heating circuit 135'.

Located to the right of the sea water cooling tower 50 in FIG. 1 is a fresh water heat exchanger 140. This heat exchanger comprises an outer fresh water tank 141. Extending through the tank 141 are a multiplicity of water pipes 142. Water pipes 142 are connected at one end to an outlet header 144 and at the other end to an inlet header 146. The outlet header 144 is connected to the cooling tower by a return line 150'. The intake of pump 148 connects to the sea water cooling tower 50. The inlet header 146 of the fresh water heat exchanger 140 is connected to the discharge side of the pump 148 by a water line 150. The tower 50 comprises a conventional vaporizing cooling tower for cooling sea water entering the tower through its sea water supply line 52. Cold sea water is pumped from the tower 50 to the fresh water heat exchanger 140 by the pump 148. This cold sea water flows through the water pipes 142 and then returns to the sea water cooling tower through the line 150. Sea water emerges from the tower through the sea water return line 54.

Indicated at 152 in FIG. 1 is a fresh water header line from which extend branch lines 154 leading to the upper wells 38 in the several fresh water condensing chambers 22. Valves 154' are operable to control the flow rates through the individual branch lines 154. Header line 152 connects to the discharge of a pump 155, the intake of which is connected to the fresh water tank 141 of the exchanger 140. Also connected to the fresh water tank 141 is a second fresh water header line 156. Line 156 connects to the lower wells 44 in the several condensing chambers 22 through branch lines 158.

During operation of the apparatus, the cold sea water recirculating through the fresh water heat exchanger 140, from the sea water cooling tower 50, cools the fresh water within the fresh water tank 141 of the exchanger. This cold fresh water is pumped from the tank 141 to the upper wells 38 of the condensing chambers 22 by the pump 155. The water drips from these latter wells to the upper underlying trays 28 through the weep holes 40 in the chamber walls 34. The cold fresh water then drips downwardly from tray to tray through the weep holes 42 in the trays. Eventually, the water drips into the lower wells 44 in the condensing chambers from whence it returns to the fresh water heat exchanger 140. According to the preferred practice of the invention, this heat exchanger is located below the wells 44 so that fresh water flows by gravity from the lower wells in the condensing chambers to the fresh water tank 141 of the exchanger.

As will be seen shortly, the fresh water tank 141 eventually fills up during operation of the desalinization apparatus. To the right of the heat exchanger 140, in FIG. 1, is a fresh water collection tank 160. This tank is connected to the top of the fresh water heat exchanger tank 141 through an overflow line 162. Tank 160 is vented to atmosphere so that fresh water may overflow from the tank 141 into the collection tank 160.

In order to monitor and control the operation of the present desalinization apparatus, it is necessary to know the temperatures at various points in the apparatus. To this end, the apparatus is equipped with thermometers 164 from which the temperatures may be read.

This completes the structural description of the illustrated sea water desalinization apparatus 10. The operation of the apparatus will now be described. As already noted, the apparatus is designed primarily for use in desert and other hot dry areas.

Before starting the apparatus, the solar heater 74 is conditioned for operation by filling its fresh water circuit, including the solar energy absorbers 76, with fresh water and filling the chamber 100 of the sea water heat exchanger 78 with sea water. Tank 141 of the fresh water heat exchanger 140 is filled with fresh water. The apparatus is then ready to run.

The apparatus may be started in the early morning when the ambient air temperature reaches 70° or more. When starting the apparatus, the solar heater 74 is first operated for a period of time sufficient to bring the sea water in the heat exchanger 78 to a temperature of 100° or more. This is accomplished by running the fresh water pump 112 of the solar heater to recirculate fresh water through the solar energy absorbers 76 and the heat exchanger 78. When the sea water in the heat exchanger 78 has been raised to the proper temperature, fan 26, sea water pumps 64, 68, 122 and 148, and fresh water pump 155 are started. Fan 26 induces flow of hot dry ambient air into the inlet 14 of conduit 12. Sea water pump 64 delivers sea water to the lower well 44 of air conditioning chamber 18 and to the sea water cooling tower 50, wherein the sea water is cooled by vaporizing. Sea water pump 68 recirculates sea water from the lower well in the air conditioning chamber 18 to its upper well 38, after which the water drips down through the trays 28 of the chamber. Sea water pump 122 pumps hot sea water from the sea water heat exchanger 78 to the upper wells 38 of the several sea water vaporizing chambers 20. Warm sea water drips down through the inner trays 28 of these chambers into the lower wells 44 in the chambers and is then returned to the heat exchanger 78 for reheating. Sea water pump 148 pumps cold sea water from the sea water cooling tower 50, through the fresh water heat exchanger 140, back to the cooling tower 50. During its flow through the heat exchanger 140, this cold sea water absorbs heat from, and thereby cools the fresh water within the tank 141 of the exchanger. Finally, fresh water pump 155 pumps cold fresh water from the heat exchanger 140 to the upper wells 38 of the fresh water condensing chambers 22. Cold fresh water then drips down through the inner trays 28 of these chambers to the lower wells 44 in the chambers. The water returns by gravity to the heat exchanger tank 141.

At this time, therefore, all parts of the desalinization apparatus 10 are operating. The hot dry air entering the conduit 12 through its inlet 14 passes first through the air conditioning chamber 18. During its passage through this chamber, the air flows through the passages 32 between adjacent trays 28. As it flows through these passages, the air contacts the pools of sea water, which collect in the troughs 30 from the trays 28 in the chamber, as well as the sea water which drips from tray to tray through the weep holes 42 in the trays. Since the entering air is hot and dry, it evaporates and absorbs sea water as the air flows through the chamber. Accordingly, the air is cooled by evaporation and humidified. The length of the air conditioning chamber 18, in the direction of air flow therethrough, is made such that during its passage through the chamber, the entering air is cooled approximately to the prevailing wet bulb temperature of the ambient air and humidified approximately to saturation at such temperature. As a result, the air emerging from the air conditioning chamber 18 and entering the first sea water vaporizing chamber 20 is cold and saturated with water vapor.

As this cold, saturated air flows through the first vaporizing chamber, it contacts the warm water vapor evolved from the warm sea water dripping through the chamber. This contact of the cold saturated air with the warm vapors in the vaporizing chamber suspends the moisture in such vapors into a mist or fog F which enters the following condensation chamber 22. This mist or fog is composed of minute droplets of fresh water, which are devoid of the impurities in the sea water from which they were derived.

Upon flowing through the condensation chamber 22, the mist or fog F wipes against the exposed surfaces of the trays 28 in the chamber and contacts the pools of cold fresh water which collect in the troughs 30 of the trays, as well as the droplets of cold fresh water which trickle downwardly from tray to tray. The fresh water droplets in the entering fog are thereby condensed on the exposed surfaces of the trays, on the pools of fresh water in the trays, and on the droplets of fresh water trickling from tray to tray. Fresh water thus produced by condensation of the water droplets in the fog F collects in the lower well 44 of the vaporizing chamber 20, along with the fresh water delivered to the chamber from the fresh water heat exchanger 140. This combined fresh water recirculates through the fresh water heat exchanger 140, wherein it is recooled, and then returns to the condensing chamber 22.

It is to be noted that in the case of the condensing chamber 22, the weep holes 40 in the top wall of the chamber are omitted over every other vertical row of troughs 30. As a result, only alternate vertical rows of troughs receive cold water from the upper well 38 of the chamber. This is done to achieve maximum condensation of water from the fog entering the chamber and to reduce air friction. The length of the condensation chamber 22 in the direction of air flow therethrough, is made such that substantially all fresh water vapor condenses from the air before the latter emerges from the chamber and enters the following sea water vaporizing chamber 20. Accordingly, as the air approaches the exit end of the first condensing chamber 22, it is cooled by contact with the cold fresh water dripping through the chamber. In addition, while the water droplets which are entrained in the air entering the condensing chamber and make up the fog F, are condensed out as the air flows through the chamber, the cold air emerging from the chamber and entering the following sea water vaporizing chamber 20, is still relatively saturated. Accordingly, as the air passes through the following vaporizing chamber it condenses the vapors evolved from the warm sea water in the latter chamber into a mist or fog which is condensed in the following condensing chamber. This cycle is repeated in each subsequent vaporizing chamber and condensing chamber, until the air finally emerges through the outlet 16 of the conduit 12.

It is now apparent that operation of the present desalinization apparatus involves a continuous sea water conversion process during which cold humid air flows alternately through sea water vaporizing chambers, wherein the air contacts hot water vapor evolved from hot sea water to form a mist or fog, and condensing chambers, wherein this mist or fog contacts cold fresh water, to condense out the water droplets in the fog. The fresh condensing water and the fresh water condensate are combined and recooled and thereafter returned to the condensing chambers for repetition of the condensing process. It is obvious, therefore, that the quantity of fresh water in the tank 141 of the fresh water heat exchanger 140 gradually increases during operation of the apparatus. When the tank fills, it overflows into the collection tank 160, which may comprise a large reservoir, for example, wherein the fresh water is stored for use.

While in the foregoing specification, there has been described, by way of example, a presently preferred embodiment of the invention, the invention is not to be deemed as being limited to the precise details of execution thus disclosed, and it will be understood that the invention includes, as well, all such changes and modifications in the parts, and in the construction, combination and arrangement of parts, as shall come within the purview of the appended claims.

I claim:
1. Apparatus for purifying water comprising:
   a conduit means having communicating chambers comprising an air conditioning chamber followed successively by a vaporizing chamber, and a condensing chamber,
   means for inducing air flow through said conduit in such manner that said air flow occurs through said chamber successively,
   means in said conditioning chamber for cooling and humidifying the air as it flows through the latter chamber,
   means for supplying hot water to be purified to said vaporizing chamber, whereby the cold humid air emerging from said conditioning chamber contacts the hot water vapor evolved from said hot water to condense said vapor into a fog, and
   means in said condensing chamber for condensing the water droplets in said fog comprising means to mix fresh water with said fog.

2. Apparatus for purifying water comprising:
   a conduit having an air conditioning chamber followed by alternate vaporizing and condensing chambers,
   means for inducing air flow through said conduit in such manner that said air flow occurs first through said conditioning chamber and then alternately through said vaporizing and condensing chambers,
   means in said conditioning chamber for cooling and humidifying the air by contacting the air by cool water as it flows through the latter chamber,
   means in each condensing chamber for cooling and humidifying said air as the latter flows through each condensing chamber, and
   means for supplying hot water to be purified to each of said vaporizing chambers, whereby the cold humid air emerging from said conditioning chamber and from each condensing chamber contacts the hot water vapor evolved from the hot water in the following vaporizing chamber, thereby to condense said vapor into a fog, and water droplets in said fog are condensed to a liquid in the following condensing chamber.

3. Sea water desalinization apparatus for use in a hot dry climate, comprising:
   a conduit means having communicating chambers comprising an air conditioning chamber followed successively by a vaporizing chamber, and a condensing chamber,
   means for inducing flow of hot, dry ambient air through said conduit in such manner that said air flow occurs through said chambers successively,
   means in said conditioning chamber for contacting the air flowing therethrough with cold water, thereby to cool and humidify the air,
   means in said vaporizing chamber for exposing the cold humid air emerging from said conditioning chamber to hot sea water to be purified, whereby said cold humid air contacts the hot water vapor evolved from said hot sea water to create a fog, and means in said condensing chamber for condensing water droplets in said fog comprising means to mix fresh water with said fog.

4. Sea water desalinization apparatus for use in hot dry climates, comprising:

a conduit having communicating air conditioning, vaporizing, and condensing chambers, means for inducing flow of hot dry ambient air through said conduit in such manner that said air flow occurs through chambers successively, dispensing means in each chamber for introducing water into the path of air flow through the respective chamber, means for delivering cold water to said dispensing means of said conditioning chamber, whereby the air is cooled and humidified as it flows through said conditioning chamber, means for delivering hot sea water to be purified to said dispensing means of said vaporizing chamber, whereby the cold humid air emerging from said conditioning chamber contacts the hot watery vapor evolved from said hot sea water to condense said vapor into a fog, and means for delivering cold fresh water to said dispensing means of said condensing chamber, whereby the water droplets in the fog emerging from said vaporizing chamber contact and are condensed on the cold fresh water in said condensing chamber.

5. Sea water desalinization apparatus for use in hot dry climates, comprising:

a conduit having communicating air conditioning, vaporizing, and condensing chambers, each chamber having an upper well and a series of horizontal trays arranged one over the other below said well, and said trays having upwardly opening troughs defining therebetween air flow passages extending lengthwise of said conduit, the bottom wall of each well and said trays having holes aligned with said troughs, means for delivering cold water to the well of said conditioning chamber, whereby cold water drips downwardly from tray to tray through said conditioning chamber, means for delivering hot sea water to be purified to the well of said vaporizing chamber, whereby hot sea water drips downwardly from tray to tray through said vaporizing chamber, means for delivering cold fresh water to the well of said condensing chamber, whereby cold fresh water drips downwardly from tray to tray through said condensing chamber, means for inducing flow of hot dry ambient air through said conduit in such manner that said air flow occurs through said conditioning, vaporizing, and condensing chambers successively, and said air being cooled and humidified as it flows through said conditioning chamber, the cold humid air emerging from said conditioning chamber contacting the hot water vapor evolved from the hot sea water in said vaporizing chamber to produce a fog, and the droplets of water in said fog contacting and being condensed on the cold fresh water in said condensing chamber.

6. Sea water desalinization apparatus according to claim 4, wherein:

said means for delivering hot sea water to said dispensing means of said vaporizing chamber comprises a solar heater for heating sea water by solar radiation.

7. Sea water desalinization apparatus according to claim 4, wherein:

said means for delivering hot sea water to said dispensing means of said vaporizing chamber comprises a solar heater including a fresh water circuit having at least one solar energy absorber for heating fresh water in said circuit by solar radiation, a sea water circuit for conveying salt water to said well of said vaporizing chamber, and a heat exchanger thermally coupling said circuits, whereby sea water in said sea water circuit is heated by heat exchange with the fresh water in said fresh water circuit.

8. Sea water desalinization apparatus comprising:

a conduit having an air conditioning chamber followed by alternate vaporizing and condensing chambers, means for inducing flow of hot dry ambient air through said conduit in such manner that said air flow occurs first through said conditioning chamber and then alternately through said vaporizing and condensing chambers, each chamber having an upper well, a lower well, and air passages disposed between said upper and lower wells across which water is adapted to flow from said upper well to said lower well, means for continuously recirculating cold sea water from the lower well to the upper well of said conditioning chamber, whereby cold sea water flows downwardly through said conditioning chamber, means including a solar heater for continuously circulating hot sea water from the lower wells to the upper wells of said vaporizing chambers, whereby hot sea water flows downwardly through said vaporizing chambers, means including a water cooler for continuously recirculating fresh water from the lower wells to the upper wells of said condensing chambers, whereby cold fresh water flows downwardly through said condensing chambers, the air entering said conduit being cooled and humidified as it flows through said conditioning chamber and each following condensing chamber, the cold humid air emerging from said conditioning chamber and each condensing chamber contacting the hot water vapor evolved from the hot sea water in the following vaporizing chamber to produce fog, and the droplets of water in said fog contacting and being condensed on the fresh water in each following condensing chamber, and said fresh water recirculating means including means for collecting the fresh water condensed in said condensing chambers.

References Cited by the Examiner

UNITED STATES PATENTS

| | | | |
|---|---|---|---|
| 2,803,591 | 8/1957 | Coanda et al. | 202—234 |
| 2,902,414 | 9/1959 | Schmerzler | 202—46 |
| 3,168,450 | 2/1965 | Black | 202—234 |

ROBERT A. O'LEARY, *Primary Examiner.*

W. E. WAYNER, *Assistant Examiner.*